Aug. 25, 1936.  H. ENDRES  2,051,990
TRACTION ADJUSTING DEVICE FOR VEHICLES
Filed March 21, 1936
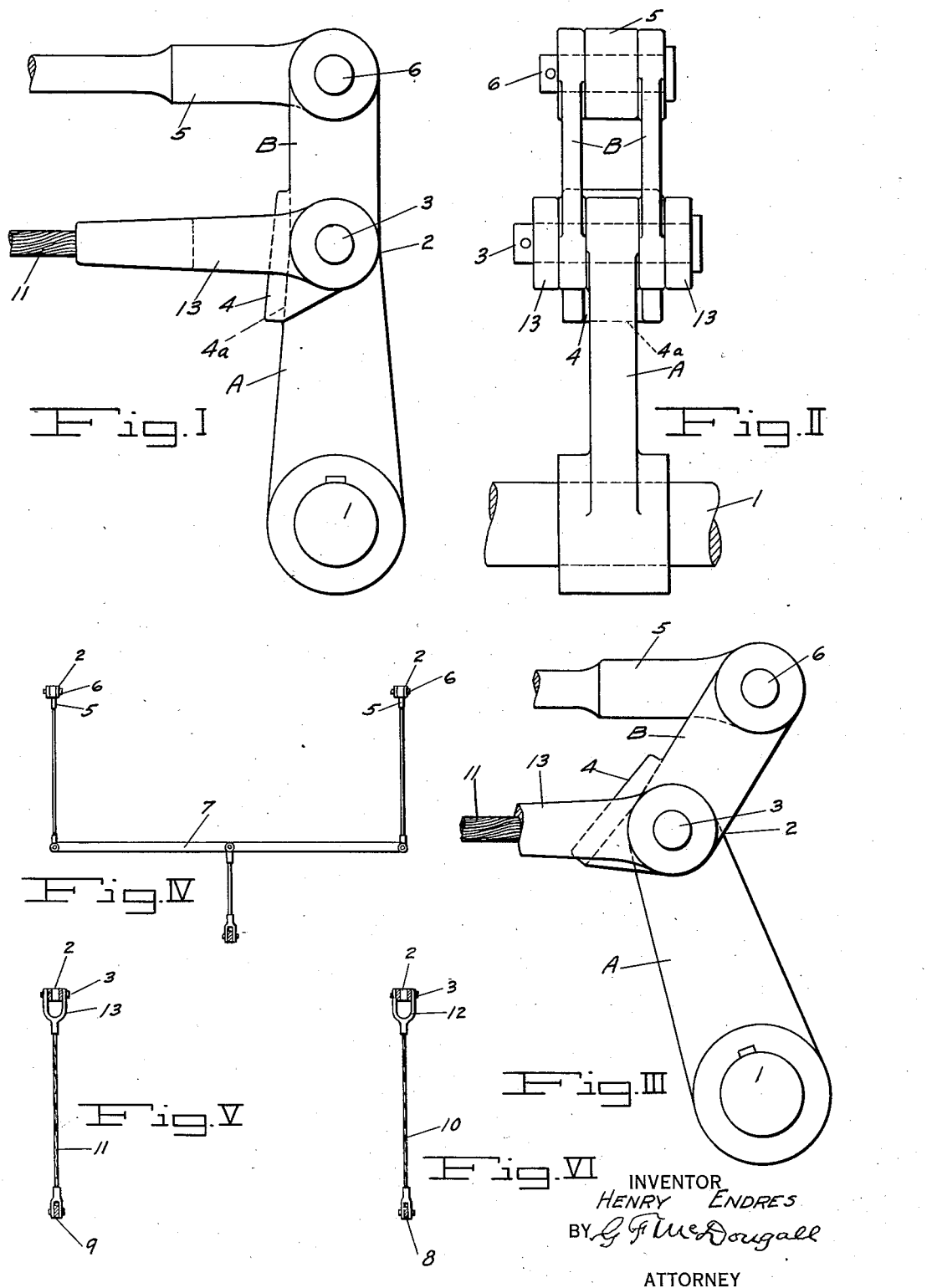
INVENTOR
HENRY ENDRES
BY G. F. McDougall
ATTORNEY Patented Aug. 25, 1936

2,051,990

UNITED STATES PATENT OFFICE 2,051,990

TRACTION ADJUSTING DEVICE FOR VEHICLES

Henry Endres, Park Place, Oreg.

Application March 21, 1936, Serial No. 70,005

3 Claims. (Cl. 188—16)

This invention relates to devices for equalizing the traction on the driving wheels of an automotive vehicle to enable the vehicle to pull out of a mud hole or a similar low traction piece of terrene when the power of the vehicle tends to be wasted by one wheel slipping while the other remains anchored on firm ground, due to the characteristic action of the differential gear necessary in all vehicles.

Obviously the correct way to retard the wheel that tends to slip is by a partial application of brakes to the slipping wheel, when the differential will deliver the power to both wheels when the resistance is equalized. Combined resistance of the wheel that had slipped on the soft surface and the braking function applied to it, is then equal to the power applied to the other wheel and the vehicle moves out of the difficult position.

Therefore, my invention relates to means for selectively applying an instantaneous partial braking effect to either wheel as may be required, instantly releasing it when the need for its partial holding is past, while retaining the service braking equipment of the vehicle in unimpaired position and in nowise interfering with its ordinary use nor preventing the instant application of the entire braking effect of the service brakes, whether or not the device above referred to is being used or not.

The invention also consists in certain new and original features of construction and combination of parts, hereinafter set forth and claimed.

Although the novel features which are believed to be characteristic of this invention will be particularly pointed out in the claims appended hereto, the invention itself, as to its objects and advantages, the mode of its operation and the manner of its organization, may be better understood by the following description, taken in connection with the following drawing forming a part thereof, in which,—

Fig. I is in elevation, a figure illustrating some of the essential features of my new invention, and shows the combination of parts in their normal position when the auxiliary braking or equalizing device is not being used, and may likewise indicate either the off or on position of the service braking equipment;

Fig. II is an orthographic projection of Fig. I;

Fig. III is a view showing the peculiar action of the jack-knife lever when the equalizing function is being employed, the said jack-knife lever being hereinafter more completely described in detail;

Fig. IV is a diagrammatic layout showing the application of the service brakes;

Fig. V is a diagrammatic view of the cable controlled means for applying the special function of my equalizing device to the righthand driving wheel of a vehicle; and Fig. VI illustrates a duplicate arrangement on the lefthand side of a vehicle, Figs. V and VI being spaced apart substantially in their normal position.

A brake applying shaft 1, which is a short shaft mounted on each side of the driving axle housing to apply a brake by rotation thereof, so well known as to need no further description, has rigidly mounted thereon a jack-knife lever 2, composed of two parts, a lower bellcrank lever indicated by the letter A and an upper extension lever indicated by the letter B, which are pivoted together in any suitable manner at 3.

Means are provided such as the cross plate 4 so that when the extension B is approximately in alignment with the lower bell crank lever A, further relative deflection is prevented by the jack-knife joint arrangement consisting of the pivot 3 and the cross plate 4, the lower cross portion of which comes into engagement as at 4a, Fig. I, below the pivot 3.

The service brakes operate through the reach-rod 5, pivotally connected to the structure generally represented by the numeral 2 at 6. 5 is a solid rod as is customary and necessary to preserve the equalization of the brake system.

It is understood that the cross evener 7 is diagrammatic and that brake equalizing systems cannot, as a general thing, have an equalizing evener or beam clear across the underside of the vehicle body.

8 and 9 indicate the top view of vertical pivoted control levers which may be placed in any convenient position handy to the operator of the vehicle and which are capable of applying tension to the cables 10 and 11 and through them to the center pivot 3 of the jack-knife lever 2 by means of the clevices 12 and 13 pivoted at 3. See Figs. I and III.

It will be instantly apparent that selective application of manual power through either of the levers 8 or 9 will actuate the service brake connected thereto in any degree, proportionate to the power applied, without materially affecting the service braking equipment on any other wheel.

Drivers of vehicles equipped with this device become extremely skillful in its use and can pull a vehicle out of a mud hole of the character indicated at the beginning of this specification with a motion so fast that it is difficult to see what has been done, and release the auxiliary in time to apply the full power of the motor to both wheels as soon as they reach firm ground.

Obviously the jack-knife lever generally indicated by the numeral 2 may be constructed in many different forms provided attention is given to the essentials that the assembly must be rigid in all directions except one and in that one direction it must be free to jack-knife; as when tension is applied to the cable 11 and by its employment and by the use of a cable instead of a rod at 11, the use of one system of brakes has little if any effect on the other system. There is very little tendency to compress the service brake rod 5. It merely bends down a little as the angularity of the assembly 2 reaches the position shown in Fig. III, and when service braking is applied through the rod 5, the cable exerts no appreciable end resistance to interfere with the application of brakes or to affect the lever 8 or 9.

Having thus fully described my invention so that anyone familiar with the art to which it appertains may make and use it, what I claim as new and desire to secure by Letters Patent, is,—

1. Means for equalizing power applied to driving wheels through differential gearing comprising in combination, a brake device for each wheel, service brake transmissions effective to equally apply said brakes, a jack-knife lever forming a part of said transmissions, a tension cable arranged to independently brake one wheel by energy applied at the joint of the jack-knife lever and means for selectively applying tension to the cable.

2. Means for equalizing the resistance of driving wheels on unequal tractive surfaces to power applied through differential gearing, comprising a service brake for each driving wheel, transmissions forming a part of said service brake, said transmissions including a separate jack-knife lever in the transmission to each wheel and independent manual brake applying means cable connected to the center pivot of each jack-knife lever whereby instant selective partial braking may be applied to any given driving wheel without affecting any other wheel.

3. Means for equalizing the resistance of driving wheels on unequal surfaces when power is applied through differential gearing comprising in combination, a service braking device for each wheel, means for simultaneously actuating said braking device with respect to all wheels and independent means for selectively braking one wheel, defined in part as a transmission system for the service brake, said transmission including a jack-knife lever of the character described in the part transmission system for each wheel and cable and lever means for bending said jack-knife at its pivot, whereby braking effect is selectively applied to a single wheel to compensate for deficient traction.

HENRY ENDRES.